United States Patent [19]

Abel et al.

[11] Patent Number: 5,289,371
[45] Date of Patent: Feb. 22, 1994

[54] SYSTEM AND METHOD FOR ROUTING DATA AND COMMUNICATIONS

[75] Inventors: William D. Abel, Muttontown; Thomas D. Cali, Douglas Manor, both of N.Y.

[73] Assignee: MemoryLink, Inc., Boca Raton, Fla.

[21] Appl. No.: 943,501

[22] Filed: Apr. 11, 1992

[51] Int. Cl.$^5$ .............................................. G06F 15/24
[52] U.S. Cl. ................................ 364/401; 364/400; 364/407; 379/91; 379/93; 379/94; 379/111; 379/112; 379/113; 379/133; 379/134; 379/135; 379/136; 379/137; 379/140
[58] Field of Search .................. 364/401, 400, 407; 379/93, 94, 91, 111, 112, 113, 133, 134, 135, 136, 137, 140

[56] References Cited

U.S. PATENT DOCUMENTS

| | | | |
|---|---|---|---|
| 4,530,067 | 7/1985 | Door | 364/401 |
| 4,734,858 | 3/1988 | Schlafly | 364/408 |
| 4,757,267 | 7/1988 | Riskin | 379/113 |
| 4,797,818 | 1/1989 | Cotter | 364/401 |
| 4,817,129 | 3/1989 | Riskin | 379/88 |
| 4,972,318 | 11/1990 | Brown et al. | 364/403 |
| 5,003,472 | 3/1991 | Perrill et al. | 364/401 |
| 5,023,904 | 6/1991 | Kaplan et al. | 379/91 |
| 5,038,283 | 8/1991 | Caveney | 364/403 |
| 5,073,929 | 12/1991 | Katz | 379/93 |
| 5,159,698 | 10/1992 | Harrington et al. | 379/112 |
| 5,193,110 | 3/1993 | Jones et al. | 379/94 |

OTHER PUBLICATIONS

Gareiss, Robin: "FTD Makes Customer Connection With ANI", Communications Week, may 27, 1991, p. 40.
PR Newswire: "Florafax and 800–Flowers Announce Agreement," Jan. 17, 1990.
"James McCann and 800–Flowers": Chain Store Age Executive Edition, Dec. 1990, p. 35.
"Ordermation", Author Unknown, brochure by Computer Marketing Corporation (Mar. 24, 1984; Mar. 27, 1984; Mar. 15, 1985).

*Primary Examiner*—Roy N. Envall, Jr.
*Assistant Examiner*—Joseph Thomas
*Attorney, Agent, or Firm*—Willian Brinks Hofer Gilson & Lione

[57] ABSTRACT

A system for routing data and communications to one of a plurality of remote sites to promote reciprocal interaction among the remote sites. The system includes a central processing unit and a storage device to store a first set of data identifying a plurality of remote sites and a second set of data identifying the frequency at which each of the remote sites communicates with the system. The system selects a particular remote site to receive a particular communication by analyzing the second set of data. The system also contemplates a method of routing data and communications including the steps of storing routing data for identifying a plurality of remote sites and the frequency at which each of the remote sites communicates with a central processor, receiving a communication at the central processor, analyzing the routing data to select a particular remote site, and forwarding the communication to the selected remote site.

46 Claims, 2 Drawing Sheets

SYSTEM AND METHOD FOR ROUTING DATA AND COMMUNICATIONS

FIELD OF THE INVENTION

The present invention relates generally to systems and methods for automatically routing and directing communications and data, and, in particular, to a system and method for routing communications from a central processing unit to one of a plurality of remote locations.

BACKGROUND OF THE INVENTION

As society becomes more and more spread out, the need for automated systems and methods for efficiently and equitably routing orders, data and communications from one location to one of a possible plurality of locations is evergrowing. Further, businesses that are widely spread out need an efficient method of generating referrals or reciprocal business orders. The florist industry provides a good example of such a need. There are many florist shops located across the country. Consumers often wish to send flowers, plants, or other gift items to people located in a different city. Presently there are several ways in which such an order can be completed.

One common way is simply for a customer to call or visit a nearby florist with an order to be delivered in a different locality. These orders are accomplished when the local florist (the "sending" florist) telephones the details of the order to a "delivering" florist (situated in the locale of the recipient of the order) who fills the order and delivers the flowers to the recipient. This process is time consuming because the local florist usually consults a large directory of florists provided by a wire service organization of which it is a member to obtain the telephone number and coding information of the delivering florist.

There are presently six such wire service organizations Florist Transworld Delivery Service, Redbook, Carik, Teleflora, American Floral Society and Florafax. Each of these wire service organizations acts as a "clearing house" for transactions between its members. Transacting orders through these wire service organizations requires the delivering florist to take the time to fill out a report of "incoming wire orders" and send this to the appropriate wire service organization to obtain payment for the services rendered. This process is also costly because the various wire service organizations charge a significant commission for their services in acting as a clearing house among the various member florists.

Some florists may attempt to generate referral or "reciprocal" orders by placing costly advertisements in which acknowledgment is made of the willingness to reciprocate business to florists who favor their shop with deliverable orders in the various membership directories published by the wire service organizations. The process is further encumbered by the substantial lag between the time an order is processed and the time each delivering florist receives payment. This is due to the fact that the wire service organizations generally send monthly or bi-monthly statements and settle their bills at that time.

Some florists may subscribe to the Mercury Network, which is owned by the Florist Transworld Delivery Service ("FTD"). The members of the Mercury Network rent computer terminal equipment from FTD and use this equipment to send and receive orders and other communications. The main difference between the manner in which florists complete orders using the Mercury Network and the manner of completing orders described above is that orders are transferred by use of a distributed network of computer terminals instead of by telephone. The equipment is costly, takes up valuable floor space, is cumbersome to operate and does not allow direct personal contact between the sending florist and the delivering florist. This lack of personal contact makes special design, handling or delivery instructions difficult to accommodate.

Since there are more than 40,000 florists in the United States today, florists lack a practical and efficient means for reciprocating orders. Except for major cities, it is unlikely that a delivering florist will generate an order for the sending florist's delivery area within a few days after the referral. Also, because the average florist receives between 25 and 40 orders each week from florists outside his delivery area (in addition to their other local business), it is difficult for a small business such as a florist to record all orders which were received from sending florists. The vast majority of florists are very small businesses and they do not have the time nor the resources to maintain a cross reference of all business referrals. For these reasons, the average florist will simply consult a membership directory (from one of the major wire service organizations) to accomplish an outgoing order.

Alternatively, consumers may order flowers through "Flowers Direct", a company which provides a direct telephone connection between the consumer and the delivering florist by means of AT&T's "INFOWORX" service. Subscribers to the Flowers Direct service pay significant amounts of money each quarter in the hopes that the company's advertising and toll-free telephone service will generate new business referrals. With this type of service, the telephone call is relayed by AT&T to the florist in the zip code nearest the recipient There is also a service called "800 Flowers" provided by a company which advertises its toll free number and acts as a "sending only" member of FTD. In this situation, the company takes the order at its computer center and then relays it through the FTD system, keeping a large commission for its efforts. Most florists do not have the resources for the advertising that is required to take advantage of such a marketing approach.

Automated systems exist as well for selecting a location to receive particular data. For example, U.S. Pat. No. 4,797,818 discloses a computerized food order/-delivery system by which a computer at a central location is programmed to receive customer orders and transmit particular order information to a predetermined particular store. This patent does not disclose, however, a system which directs orders based on a reciprocity principle. Rather, the store to receive a particular order is chosen simply based on the location of that store in relation to the consumer.

U.S. Pat. No. 4,734,858 discloses a method and system for enabling a large number of consumers to place orders for goods or services with a data terminal. The users of the system are provided with hand-held terminals on which they may enter a supplier and a particular item to be ordered. After such data is entered, the terminals may be connected to telephone lines over which the order information may be sent to a local processing center. The orders are then routed to the appropriate supplier. This patent does not disclose, however, a system which directs orders based upon reciprocity among those sending and receiving orders. Rather, orders are directed to the supplier, which the consumer chooses on his or her data terminal.

What is, therefore, lacking in the art is a system and method for enhancing and ensuring reciprocity in the sending of orders among florists, and also a more efficient method and system for routing data and communications and making payment settlements. Such a system and method would ensure that merchants who are located in or who serve a specific area receive reciprocal (incoming) orders in proportion to their sending activity and in relation to the sending activity of other florist members who are located in or who serve the same specific area.

SUMMARY OF THE INVENTION

It is therefore an object of the present invention to provide a system and method for routing data and communications received at a central location to one of a plurality of remote locations based on a comparison of the frequency at which each of the remote locations sends data and communications over the system.

It is also an object of the present invention to provide a system and method for keeping track of all communications sent through the system to ensure reciprocity in the sending of communications to subscribers of the system.

It is another object of the present invention to provide a system and method for expediting the payment and settlement of accounts among system users.

It is yet another object of the present invention to provide a system and method for routing orders which is inexpensive to operate and allows higher operating margins to subscribers.

In view of the above, a system for routing communications to one of a plurality of remote sites is provided comprising a central processing unit and a storage device to store a first set of data identifying the plurality of remote sites. Also stored is a second set of data indicating the frequency at which each of the plurality of remote sites communicates with the system. Means are provided for analyzing the second set of data to select a specific remote site to receive a particular communication.

According to a another aspect of the invention, a method is provided for routing communications. The method includes the step of storing routing data for identifying a plurality of remote sites and the frequency at which each of the remote sites communicates with a central processor. The method also includes the steps of receiving a communication at the central processor, analyzing the routing data to select a particular remote site to receive the communication, and forwarding the communication to the selected remote site.

The present invention advantageously provides a system and method for routing communications and data from a central processing unit to one of a plurality of remote locations to enhance and ensure reciprocity among users of the system. Thus, the invention is particularly well suited for industries in which businesses often receive referrals from like businesses in the same industry, but in different locales.

These and other features and advantages of the invention will be apparent upon consideration of the following detailed description of the presently preferred embodiments of the invention taken in conjunction with the appended drawings.

DETAILED DESCRIPTION OF THE PRESENTLY PREFERRED EMBODIMENTS

A. System Hardware

Figure 1:
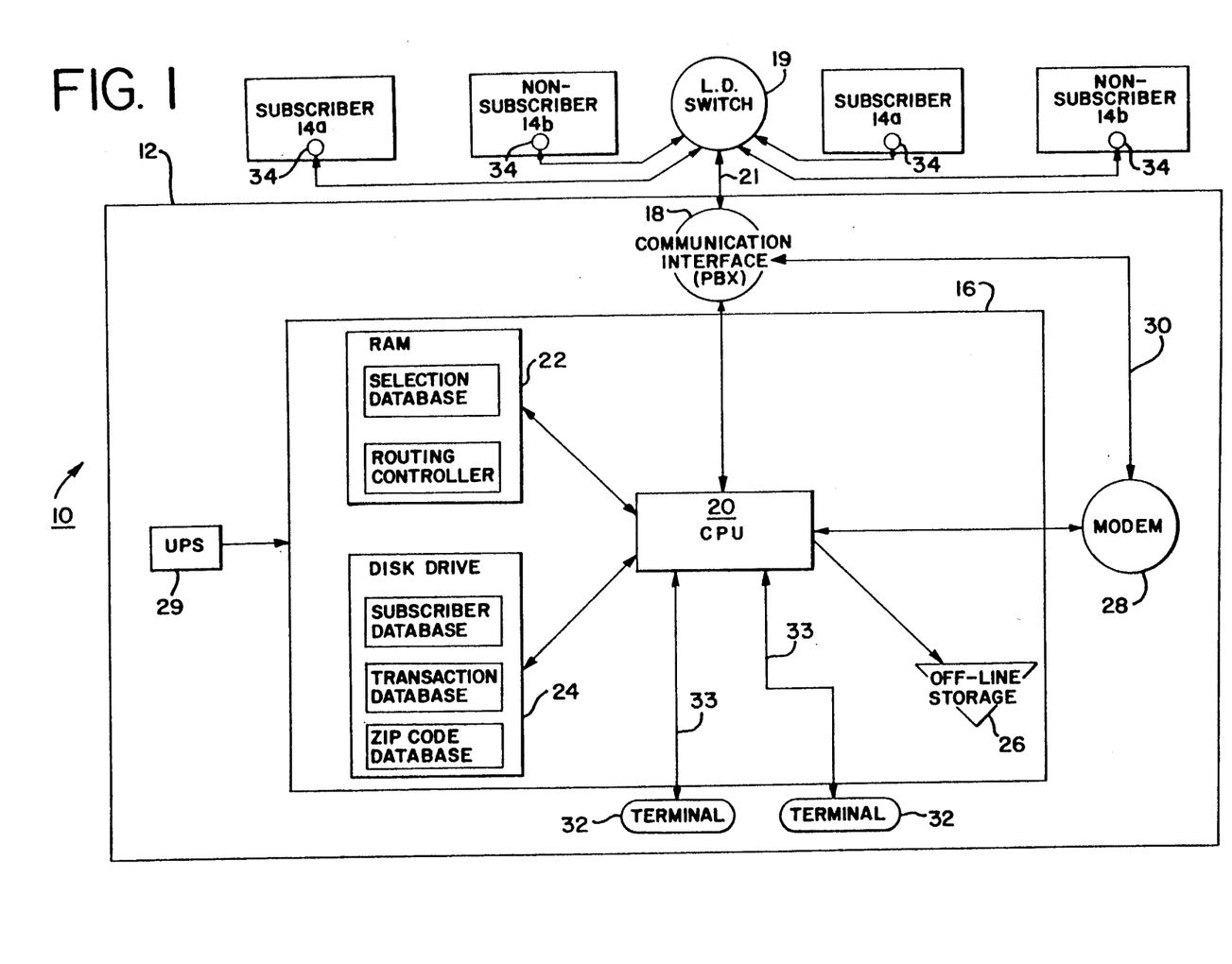
FIG. 1 is a block diagram of a data/communication routing system made according to the preferred embodiment of the present invention.

FIG. 1 is a block diagram representing a data/communication routing system 10 made in accordance with the presently preferred embodiment of the invention. In general, the data/communication routing system 10 operates to route data or communications to one of a plurality of possible locations. The data/communication routing system 10 shown in FIG. 1, preferably includes a central processing site 12, a plurality of first remote sites 14a, and a plurality of second remote sites 14b. In the preferred embodiment, the first remote sites 14a constitute floral shops who have subscribed to the data/communication routing system 10 and the second remote sites 14b constitute non-subscribers, such as individual consumers and nonsubscribing merchants. Accordingly, the central processing site 12 operates to route data or communications received from either non-subscribers 14b or subscribers 14a to one of the plurality of subscribing floral shops 14a.

While the preferred embodiment of the present invention is utilized in the floral industry and uses a central processing site, the invention may be embodied in many different industries and in many different forms without departing from its spirit or essential scope. For example, in the travel industry, travel agents are spread out and serve different locales. This industry, like the floral industry, will benefit from the present invention which provides a system and method for ensuring and enhancing referrals or reciprocal business. Furthermore, instead of the central processing site 12, the present invention may be implemented using a distributed system in which the processing elements are located in remote sites and are interconnected through a distributed network.

The central processing site 12 preferably includes a computer system 16 and terminals 32 which are coupled to the computer system 16. The computer system 16 is coupled to a central communication interface 18, which permits the central processing site 12 to communicate with the remote sites 14a, 14b. The computer system 16 also preferably includes a central processing unit ("CPU") 20 for executing programs and controlling the operation of the computer system 16.

In the presently preferred embodiment of the invention, the computer system 16 comprises two computers manufactured by Digital Equipment Corporation: Model No. CL-44JT1-VB, Multiline DECvoice 24-line VAX 4000 Series Minicomputer Model 400; and Model No. CL-42HT1-VA, Multiline DECvoice 16-line VAX 4000 Series Minicomputer Model 200 Timeshare. The Model 400 computer is coupled to four Multiline DECvoice modules (model no. DTC05-SA) and the Model 200 is coupled to two such DECvoice modules. The DECvoice modules are configurable under software control to support digitized speech. The Model 200 and 400 computers preferably operate in parallel.

The communication interface 18 is preferably a digital Private Branch Exchange ("PBX"). In the preferred embodiment, the communication interface comprises a PBX model no. SX-2000, manufactured by Mitel Inc. of Florida. This PBX provides the network signalling capability to allow the transfer and conferencing of incoming telephone calls.

The terminals 32 are coupled to the CPU 20, preferably via a serial port, to allow terminal operators to transmit data to and receive data from the computer system 16. The terminals 32 also preferably include a screen (not shown). In the preferred embodiment, the terminals 32 are connected through a local area network 33, such as Ethernet or the like, and the system utilizes the PATHWORKS DOS software, provided by Digital Equipment Corporation, to establish and control the terminals 32. On the network 33, the terminals 32 are preferably served by a DECserver 700 (model no. DSRVW-CA) network server (not shown). Each of the terminals 32 also preferably comprise a DECstation 320sx base system (model no. DJ-PC443-03).

In the preferred embodiment, the computer system 16 further includes on-line memory 22, 24, and an off-line storage device 26. The on-line memory 22 preferably comprises Random Access Memory ("RAM") in the form of integrated circuits and the on-line memory 24 preferably constitutes a hard disk drive. In the preferred embodiment, the on-line memory 22, 24 is central to and shared by both the Model 200 and 400 computers. Also, the preferred embodiment utilizes "disk shadowing" in which the data stored in on-line memory 22, 24 is duplicated for back-up purposes. Such arrangements are well known in the art and further description is not required herein. The off-line storage device 26 is preferably a magnetic tape device. As those skilled in the art will appreciate, the computer system 16 of the present invention may utilize different memory devices than the ones disclosed herein without departing from the spirit and scope of the invention.

In the preferred embodiment, the computer system 16 is also coupled to an Uninterruptable Power Supply ("UPS") system 29. The preferred UPS system is the 10KVA UPS System, model no. 4N-AEAAL-BA, manufactured by Exide Corporation. This system prevents data which is stored in the on-line memory 22, 24 from being lost due to a power interruption. The UPS uses battery backups to power the computer system 16 down in phases in the event of a power failure. Such UPS systems are well known in the art and need not be discussed further herein.

The computer system 16 is also preferably coupled to a telephone modem 28, which is operable to communicate over a switched telephone line 30. In the preferred embodiment, the telephone modem 28 comprises the DECmodem V32, model no. DF296-DA, also manufactured by Digital Equipment Corporation. The telephone modem 28 preferably operates at 9600 BPS. The switched telephone line 30 also preferably can support a maximum transmission speed of 56 KB/second.

As those skilled in the art will appreciate, commercially available hardware other than that discussed above may be utilized without departing from the spirit and essential characteristics of the present invention. For example, rather than using the DEC Models 200 and 400 minicomputers which have a distributed CPU, the CPU 20 may be embodied in a microprocessor based system as is known in the art.

Each of the first and second remote sites 14a, 14b includes at least one local communication interface 34. These local communication interfaces 34 communicate with the central processing site 12, as described in detail below. In the preferred embodiment, the local communication interfaces 34 comprise telephones and/or facsimile machines, which are coupled with the central processing site 12 over the telephone lines preferably by dialing an "800" or toll-free telephone number. In the preferred embodiment, each of the remote sites 14a, 14b is capable of communicating with the central processing site 12 via a first toll-free number to send telephone orders and via a second toll-free number to send facsimile orders. As those skilled in the art will appreciate, the present invention is also not limited to the input and output devices described above. For example, computer terminals can be employed to provide input to and receive output from the system.

In the presently preferred embodiment, the central communication interface 18 is directly coupled to a telephone long distance provider. The long distance provider usually provides access to a digital switching system 19 capable of handling incoming toll-free telephone calls and outgoing Wide Area Telephone Service ("WATS"). The central communication interface 18 is coupled to such a long distance provider via a digital communications facility 21, such as a "T1" two-way carrier. This communications facility 21 is capable of transmitting digital voice and data signals, and of connecting directly to a PBX. Also, the central processing unit 20 is equipped to capture Automatic Number Identification ("A.N.I.") data of the calling party, which is output by the long distance provider, and to record this information in a storage medium. The A.N.I. data is encoded on incoming telephone calls and identifies the telephone number of the calling party.

Alternatively, the central communication interface 18 may be coupled to a telephone network through a central switch (not shown) located at the telephone company's nearest regional exchange office. In this alternative embodiment, the central communication interface 18 is coupled to the central switch via a digital link such as the "T1" two-way carrier mentioned above. The central switch is also preferably connected via a trunk line to a long distance provider for handling incoming toll-free telephone calls and outgoing WATS calls. Such arrangements are well known in the art and need not be further discussed herein.

B. System Data and Software

In the preferred embodiment of the present invention, four relational databases are stored in the computer system 16: (1) a "subscriber database", (2) a "selection database", (3) a "transaction database", and (4) a "zip code database".

1. Subscriber Database

The subscriber database is preferably stored in the on-line memory 24 and serves to provide information relating to each floral shop or other type of subscriber (first remote site 14a) that subscribes to the data/communication routing system 10. The subscriber database thus comprises a table of records for each subscriber, with each record preferably containing the fields shown in Table 1. The first thirty-three (33) fields of each record are preferably updated by manual entry from the terminals 32 and the last three fields are dynamically updated by a "lookup" function described below. The subscriber database is preferably indexed based on the "subscriber I.D." field.

TABLE 1

| Fields | Description |
|---|---|
| 1-15 | zip codes served |
| 16 | subscriber I.D. |
| 17 | membership effective date |
| 18 | subscriber name |
| 19 | subscriber address |
| 20 | subscriber primary telephone number |
| 21 | subscriber secondary telephone number |
| 22 | subscriber fax number |
| 23 | subscriber credit card number |
| 24 | subscriber credit card expiration date |
| 25 | contact name |
| 26 | type of business: proprietorship, partnership or corporation |
| 27 | proprietor's social security number |
| 28 | proprietor's date of birth |
| 29 | proprietor's residence address |
| 30 | year busines started |
| 31 | number of retail locations |
| 32 | subscriber bank information |
| 33 | designation is "sending subscriber" only |
| 34 | total numbers of orders sent by subscriber |
| 35 | total number of orders received by subscriber |
| 36 | ratio of orders received to orders sent |

2. Selection Database

The selection (or "reciprocity") database is preferably stored in the on-line memory 22. This database comprises a table of records, with each record containing a subset derived from some of the fields which form the records of the subscriber database. These records preferably have the fields shown in Table 2. The first nineteen (19) fields are based on a "look-up" function of the related fields in the subscriber database and the last three fields are dynamically updated by the "routing controller program" described below. The selection database is preferably indexed based on the "subscriber I.D." field.

TABLE 2

| Fields | Description |
|---|---|
| 1-15 | zip codes served |
| 16 | subscriber I.D. |
| 17 | subscriber primary telephone number |
| 18 | subscriber secondary telephone number |
| 19 | subscriber fax number |
| 20 | total numbers of orders sent by subscriber (for all zip codes) |
| 21 | total number of orders received by subscriber (from all zip codes) |
| 22 | ratio of orders received to orders sent (all zip codes) |

The "look up" functions referred to above are implemented by database application software and operate as follows. When new subscribers are added to the subscriber database, or when old subscribers are removed, or when changes are made to the data of an existing subscriber, such changes are automatically written to the selection database. Furthermore, as mentioned above, the last three fields of the selection database are dynamically updated. Thus, the corresponding last three fields of the subscriber database are preferably updated periodically to coincide with the dynamically updated fields of the selection database. This periodic update of the subscriber database is also performed by the "look up" function.

3. Transaction Database

The transaction database is preferably stored in the on-line memory 24 and serves to track account billing and operational data. The transaction database is stored in a table of records, with each record preferably containing the fields shown in Table 3. The transaction database is preferably indexed based on the "receiving subscriber ID." field.

TABLE 3

| Fields | Description |
|---|---|
| 1 | sending subscriber I.D. (or, if non-subscriber, telephone number of calling party obtained from A.N.I. feature) |
| 2 | receiving subscriber I.D. |
| 3 | sending subscriber credit card # |
| 4 | expiration date |
| 5 | receiving subscriber credit card # |
| 6 | expiration date |
| 7 | start time |
| 8 | completion time of call |
| 9 | length of call (in minutes to nearest tenth of minute) |
| 10 | # of orders sent by sending subscriber |
| 11 | # of orders received by sending subscriber |
| 12 | # of orders sent by receiving subscriber |
| 13 | # of orders received by receiving subscriber |

4. Zip Code Database

The zip code database is also preferably stored in the on-line memory 24. The zip code database references street addresses and cities to their appropriate zip codes. In the preferred embodiment, the zip code database is stored in "read only" form because there is no need to continuously change the data contained in the zip code database.

5. System Software

In the preferred embodiment of the present invention, computer programs are also stored in the on-line memory 22. These computer programs execute on the computer system 16, and in particular on CPU 20, to implement the various tasks necessary to route incoming data or communications to their proper location. The computer programs preferably include application software which operates to route communications and orders received from either subscribers 14a or non-subscribers 14b to either on-site operators who tend to terminals 32 or to one of the plurality of subscribing floral shops 14a. The computer programs also include operating system software for tracking the start times, completion times, and length of telephone calls on the system and for keeping counts of system usage, such as the number of telephone calls received by the hour and by the day.

The computer programs preferably include a "routing controller program" for processing and routing data, communications and/or orders, and for selecting which one of the plurality of first remote sites 14a is to receive a particular communication or order. In the preferred embodiment, the routing controller program utilizes voice application software and hardware which allows the computer system 16 to interact with callers by outputting voice messages and receiving digital input via touch-tone signalling. In the presently preferred embodiment, the routing controller program is implemented with the DECVoice software (model no. QA-VFUAA-H5), provided by Digital Equipment Corporation, together with suitable relational database application software.

The voice application software of the preferred embodiment is created using the DECVoice Builder For VMS software. In the preferred embodiment, the Model 400 computer utilizes the VAX/VMS TK50 (model no. QA-001AA-H5) operating system software and the Model 200 computer utilizes the VAX/VMS EXT MDDS TK50 (model no. QT-001AA-E5) operating system software. As those skilled in the art will appreciate, other suitable computer languages and software systems can be employed and will vary depending on the host computer system 16 selected.

According to the preferred embodiment of the invention, communications are routed so that the subscribers 14a who have the lowest relationship of number of orders received to number of orders sent receive priority for orders directed to their locality. Thus, the data/communication routing system ensures that subscribers 14a receive reciprocal orders for orders referred to merchants in different localities. A flow chart of the presently preferred steps to be implemented by the routing controller program is outlined in FIG. 2.

In the preferred embodiment, the data/communication routing system 10 may be accessed in any of four different ways. As indicated at program entry points 50 and 52 in FIG. 2, the system may be accessed by telephones or facsimile machines located at the subscribing members (first remote sites 14a) or at non-subscribing merchants (second remote sites 14b) using toll-free telephone numbers. As indicated at program entry points 54 and 56, the system may also be accessed by individual consumers (second remote sites 14b) through telephone or facsimile machines using toll-free telephone numbers different than the numbers used by subscribers or non-subscriber merchants.

Figure 2:
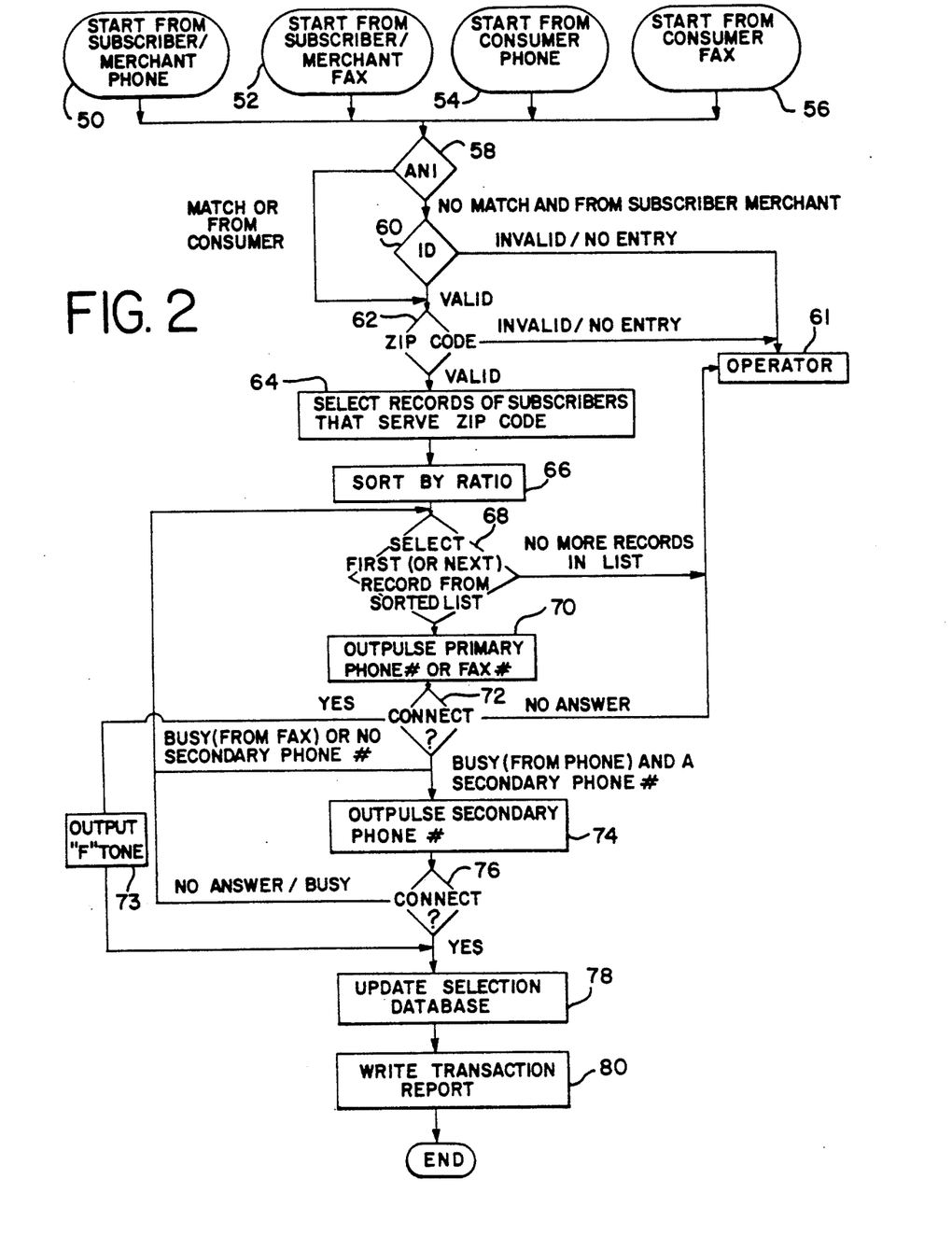
FIG. 2 is a flow chart outlining the steps performed by the preferred computer program to be executed on the system depicted in FIG. 1.

Program entry point 50 indicates the starting point of the processing of telephone transmissions from the subscribing members (first remote sites 14a) or from non-subscribing merchants (second remote sites 14b). When the communication interface 18 receives a telephone transmission, the routing controller program operates to provide the caller with pre-recorded verbal messages which instruct the caller. (Such pre-recorded verbal messages are referred to in the art as "voice prompting" the caller.) The program first identifies the caller at step 58 by using the "A.N.I." feature provided by the long distance carrier. If the telephone number encoded on the incoming telephone call matches the telephone number of a record in the selection database, then the program proceeds to step 62. If a match for the retrieved telephone number is not found, the caller is voice prompted at step 60 to enter his or her subscriber identification account code using the touchtone capabilities of his or her phone. Thus, telephone calls from non-subscribing merchants will always be directed to step 60.

In the preferred embodiment, each subscriber is assigned a five digit account code at the time of subscription. These numbers are preferably assigned sequentially so that older members have lower account codes. The program checks the validity of the inputted subscriber identification account code by comparing it with the "subscriber I.D." fields of the records in the selection database. If no match is found, the entry is invalid. If the subscriber identification account code that was entered is invalid, or if the entry was not a touchtone multi-frequency signal, or if no entry is made within five seconds, the caller is directed to an operator at step 61. Non-subscribing merchants, however, will always be directed to operators as indicated at step 61. The operators will preferably attempt to convince such non-subscribers to subscribe to the system.

If the inputted subscriber identification account code entry is valid, the program proceeds to step 62. At step 62, the caller is voice prompted to enter the five digit zip code of the locale where the order is to be delivered. The program checks the validity of the inputted zip code by comparing it to the zip code fields in the records of the selection database. If no match is found, the inputted zip code is invalid. If the computer receives an invalid zip code or if no entry is made within five seconds, the caller is directed to an operator at step 61. If the zip code entry is valid, the program proceeds to step 64 where the program begins the process of selecting which subscriber (first remote site 14a) is to receive the present communication.

At step 64 the routing controller program searches the selection database and selects all records for subscribers that serve the zip code entered by the caller. This is accomplished by selecting those subscriber records of the selection database which contain a zip code that matches the zip code entered by the caller.

At step 66, the program sorts the selected records based on the "ratio of orders received to orders sent" field. These selected records are sorted in order from the lowest ratio to the highest ratio. In the case of a tie, the selected record with more orders sent is placed first. If two selected records show identical ratios and orders sent, the record with the lower subscriber identification account code (the older subscriber) is placed first. Alternatively, the program may use some other basis to deal with ties. After this record sort is completed, the first record from the sorted list is selected at step 68. This record represents the subscriber in the selected zip code with the lowest ratio of orders received to orders sent.

At step 70 of FIG. 2, the routing controller program causes the communication interface 18 to "outpulse" (i.e., dial the telephone number of) the "subscriber primary telephone number" stored within the record selected from the sorted list over a dedicated WATS line. As indicated at step 72, if no party answers within five rings, the caller is routed to an operator at step 61. If a connection is made, the computer system 16 disconnects from the call, the caller is placed in direct communication with the selected subscriber via a conferencing bridge on the PBX and the program proceeds to step 78.

As indicated at step 72, if a busy signal is detected, the "subscriber secondary telephone number" field of the record selected from the sorted list is accessed and the communication interface 18 outpulses the telephone number contained therein over a dedicated WATS line at step 74. (If no number is stored in the "subscriber secondary telephone number" field, the next record in the sorted list is selected at step 68 and the above process is repeated. However, if the end of the list has been reached, the caller is directed to an operator at step 61.) As shown at step 76, if a connection is made, the computer system 16 disconnects from the call, the caller is placed in direct communication with the selected subscriber via a conferencing bridge on the PBX and the program proceeds to step 78.

As shown at step 76, if a there is no answer after five rings, or if a busy signal is detected, the next record of the sorted list is selected at step 68 and the above process is repeated. As shown at step 68, if the end of the sorted list of records has been reached without achieving a telephone connection, the caller is directed to an operator at step 61.

At step 78, the selection database is updated for both the receiving subscriber and the sending subscriber to reflect the new order that was sent and received, and the resulting new ratios. However, the selection database is only updated for the receiving subscriber when the caller is a non-subscribing merchant.

Thus, in the preferred embodiment, the data/communication routing system 10 operates to route floral orders based on the ratio of the number of orders received by a subscriber to the number of orders sent by that subscriber. The following example illustrates how the routing controller program operates.

As noted above, the routing controller program, upon identifying a caller and receiving a zip code entry, searches the selection database for those subscribers who serve the inputted zip code. For the purposes of this example, the subscribers identified in Table 4 are retrieved via this search:

TABLE 4

| I.D. # | Orders Rec'd | Orders Sent | Ratio |
| --- | --- | --- | --- |
| 59664 | 2 | 4 | 50% |
| 67345 | 3 | 5 | 60% |
| 74322 | 3 | 7 | 43% |
| 87449 | 5 | 10 | 50% |

After the list in Table 4 is sorted by the routing controller program, subscriber #74322 will be the first to receive the next communication because it has the lowest ratio. The second choice is subscriber #87449, which is tied with subscriber #59664 for the second lowest ratio, but has a higher number of orders sent. Subscriber #59664 is third, followed by subscriber #67345.

After a telephone call is completed and the selection database has been updated, a record of the call details and billing information is written to the transaction database, as indicated at step 80. The data required to perform this step is obtained from the record of the sending and receiving subscribers a contained in the subscriber and selection databases, and from the operating software which records the start time, completion time, and length of the call. If the sender is a non-subscribing merchant, the telephone number of the calling party is entered in the "sending subscriber I.D." field and the "sending subscriber credit card #" field is left empty.

When a caller is routed to an operator at step 61, the caller is placed in communication with an operator who operates one of the terminals 32. When a call is transferred to an operator, the subscriber database record of the caller is preferably displayed on that operator's terminal 32. The record is located using either the telephone number which was retrieved by the A.N.I. feature or the subscriber identification account code entered by the caller.

The operators are preferably capable of accessing any of the databases stored in the computer system 16 using their terminals 32. After completing any necessary data entry, the operators have the capability of releasing the call back to the routing controller program for outbound completion of the call. Where outbound completions are attempted, but there is no answer after five rings (as indicated at steps 68 and 72), the operator may personally take the order information. The operator will then relay the order to the selected subscriber when that subscriber can be contacted. Alternatively, the operator may relay the order to a non-subscriber if necessary. In the preferred embodiment, the operators also have the capability to override the selection process and cause a call to be forwarded to a location other than the one selected by the routing controller program.

The present invention operates in substantially the same manner as described above when accessed by a facsimile machine (program entry point 52) located at a subscribing member 14a or a non-subscribing merchant 14b. However, a different toll-free telephone number is preferably provided for such facsimile communications. In the preferred embodiment, the facsimile user utilizes the touchtone capabilities of the facsimile machine to input the necessary database information.

After this data is properly entered, the system operates in the same manner as described above. The only difference, however, is that at step 70 the routing controller program causes the communication interface 18 to outpulse the telephone number stored in the "subscriber fax number" field of the selected record. In addition, there is no need for step 74. As shown at step 72, for facsimile transmissions, when a busy signal is encountered, the next record of the sorted list is accessed at step 68. After a connection is made, the routing controller program causes the central communication interface 18 to send an "F tone" to the sending facsimile machine at step 73. An "F tone" signals the facsimile machine to begin sending its transmission in a manner generally known in the art. The computer system 16 then disconnects from the call, allowing the facsimile transmission to be sent.

In an alternative embodiment, the routing controller program does not voice prompt the facsimile user, but receives the subscriber identification account code and zip code by digitally reading a form which is faxed from the user. In this embodiment, a pre-printed form, having spaces for the user to enter a subscriber identification account code and a zip code, is sent via facsimile to the central communication interface 18. In this embodiment, the computer system 16 is preferably equipped with software and hardware capable of interpreting the transmission to read both the subscriber identification account code and the zip code. Such software and hardware are well known in the art and need not be further described herein.

The information received via facsimile will be provided to the routing controller program, as indicated at steps 60 and 62. Once a connection is made, the routing controller program causes the central communication interface 18 to send an "F tone" to the sending facsimile machine as described above. The computer system 16 then disconnects from the call and allows the facsimile transmission to complete.

The present invention also operates in substantially the same manner when accessed by individual consumers 14b, by either telephone or facsimile machine. There are, however, several minor differences in the operation of the system. Separate toll-free telephone numbers are provided for consumer initiated telephone calls and facsimile transmissions. For consumer communications, after the telephone number of the calling party is captured by the A.N.I feature at step 58, there is no need to compare this number with the selection database. Rather, the program automatically proceeds to step 62. The program then operates in substantially the same manner as for subscriber initiated communications.

At step 62, the caller is voice prompted to enter the zip code of the locale where the order is to be sent. The process of selecting a subscriber to receive the communication and of routing the communication to that subscriber is the same as described above. After the communication is completed, the selection database is updated at step 78. As in the case of a non-subscriber communication, however, the only record that can be updated is that of the receiving subscriber. At step 80, where a record of the order is written to the transaction database, the telephone number of the calling party (obtained from the A.N.I. feature) is entered in the "sending subscriber I.D." field, and the "sending subscriber credit card #" field is left empty.

With the exception of the several differences described, facsimile communications from consumers 14b are handled in the same manner as described above for facsimile communications from subscribers 14a or non-subscriber merchants 14b.

Finally, when a non-subscriber is routed to an operator (step 61) the caller telephone number (obtained from the A.N.I. feature) is displayed on the operator's terminal 32. This is different from the subscriber record which is displayed for subscriber initiated communications.

Different manners of inputting data from telephones may also be utilized without departing from the spirit or scope of the invention. For example, the computer system 16 is preferably equipped with voice recognition capabilities, as known in the art, so that callers from rotary telephones will be able to verbally indicate the zip code of the delivery locale. In an alternative embodiment, the present invention uses such voice recognition capabilities to receive all necessary inputs from the caller.

The present invention is also not limited to the specific steps depicted in the preferred flow chart of FIG. 2, nor is it limited to the specific manner of achieving reciprocity described above. Rather, different steps may be implemented without departing from the spirit and essential characteristics of the present invention.

The subscriber database, the selection database, and the transaction database are periodically downloaded to the off-line storage device 26 to maintain a system backup. In the preferred embodiment the off-line storage device 26 is a magnetic tape drive, and such a backup will occur at least once daily. Each backup is also preferably maintained on a storage medium for at least one year.

The invention also preferably includes application billing software stored in the computer system 16, which accesses the information stored in the transaction database. This billing software is employed to appropriately debit or credit the credit card accounts of the respective subscribers 14a who received and sent orders. This invoicing is achieved by using the modem 28 to send invoicing data to a credit card processing company, such as CYNET or NABANCO, over the switched telephone line 30. This invoicing data includes, among other requirements of the credit card processor, the relevant credit card information and the amounts of each debit or credit to the respective subscribers. In the preferred embodiment, such invoicing occurs daily.

The system of the present invention charges delivering subscribers a flat fee for each order that they receive. Sending subscribers are also credited with a flat fee, as a referral payment. Thus, the present invention eliminates the need for a clearing house wire service to settle florist debits and credits. Payments are made immediately through each subscriber's credit card accounts.

The present invention encourages and enhances reciprocity in the sending of orders among businesses. The invention provides incentives for subscribing merchants to send or refer orders to other subscribing merchants and rewards those subscribing merchants who have the highest sending activity in relation to the sending activity of other subscribing merchants who serve the same locale. The present invention is advantageous in that most businesses do not have the time nor the resources to ensure reciprocity with like businesses from which they have received orders.

In the floral industry, the present invention also eliminates the need for maintaining cumbersome paperwork in filling out reports of orders delivered and in maintaining records of such orders. Florists using the present invention also receive payments faster and more efficiently. The present invention further eliminates the need for costly and space consuming computer equipment located on the florists' premises, as required by the FTD Mercury Network. The need for florists to advertise in wire service membership directories and the high costs associated therewith are also eliminated.

The invention may be embodied in other forms than those specifically disclosed herein without departing from its spirit or essential characteristics. The described embodiments are to be considered in all respects as illustrative and not restrictive and the scope of the invention is commensurate with the appended claims rather than the foregoing description.

We claim:

1. A system for routing communications to one of a plurality of remote sites comprising:
   a central processing unit;
   a storage device operatively associated with the central processing unit to store first data identifying a plurality of remote sites and second data associated with the number of times that each of the remote sites has sent a communication to the system for a prior period of time;
   a selector operatively associated with the central processing unit to select a specific remote site to receive a particular communication from the system by analyzing the second data; and
   a communication interface operatively associated with the central processing unit for forwarding the particular communication to the specific remote site.

2. The system of claim 1, wherein the storage device comprises Random Access Memory.

3. The system of claim 2, wherein the storage device further comprises a hard disk drive.

4. The system defined in claim 1, wherein the communication interface is operable to receive and forward telephone transmissions.

5. The system defined in claim 4, wherein the communication interface is operable to receive and forward facsimile transmissions.

6. The system defined in claim 1, wherein the communication interface comprises a private branch exchange ("PBX").

7. The system defined in claim 1, further comprising means for prompting and interacting with the sender of a communication.

8. The system defined in claim 1, further comprising means for identifying the origin of a communication received by the communication interface.

9. The system defined in claim 8, further comprising means for updating the routing data.

10. The system defined in claim 1, wherein the storage device further stores billing data which identifies, for each communication sent through the system, the originator of the communication and the remote site which received the communication.

11. The system defined in claim 10, further comprising a modem operatively associated with the central processing unit.

12. The system defined in claim 11, further comprising billing means operatively associated the modem, for transmitting the billing data to a credit card processing company.

13. The system defined in claim 1, further comprising at least one terminal operatively associated the central processing unit.

14. The system defined in claim 1, wherein the second data is further associated with the number of times each of the remote sites has received a communication from the system for a prior period of time.

15. The system of claim 14, further comprising means for receiving input data from the sender of a communication.

16. The system of claim 15, wherein the selector selects a specific remote site to receive a particular communication by comparing the input data with the routing data to select a sub-group of remote sites from the plurality of remote sites, and by comparing the ratio of the number of communications received to the number of communications sent for each remote site of the selected sub-group.

17. A system for routing communications comprising:
a central processing unit;
a communication interface operatively associated with the central processing unit for receiving and forwarding communications;
a storage device operatively associated with the central processing unit to store first data identifying a plurality of remote terminals and second data associated with the frequency at which each of the plurality of remote terminals has communicated with the system;
a selector operatively associated with the central processing unit to select a specific remote terminal to receive a particular communication based on the second data; and
means responsive to the selector for causing the communication interface to forward the particular communication to the specific remote terminal.

18. The system defined in claim 17, wherein the plurality of remote terminals identified by the first data comprises telephones.

19. The system defined in claim 17, wherein the plurality of remote terminals identified by the first data comprises facsimile machines.

20. A system for routing communications comprising:
a central processor having a central processing unit, and a central communication interface for receiving and transmitting communications;
a plurality of remote sites, each remote site including a local communication interface to communicate with the central communication interface;
a storage device operatively associated with the central processing unit for storing routing data associated with the frequency at which each of the remote sites has sent communications to the central processor; and
means for comparing the routing data for at least two of the remote sites to select a particular remote site to receive a particular communication.

21. The system defined in claim 20, wherein the local communication interface comprises a telephone.

22. The system defined in claim 20, wherein the local communication interface comprises a facsimile machine.

23. The system defined in claim 20, further comprising means for identifying the origin of a communication received by the central communication interface.

24. The system defined in claim 23, further comprising means for updating the routing data after a communication is routed by the system.

25. The system defined in claim 20, wherein the storage device comprises a Random Access Memory.

26. The system defined in claim 25, wherein the storage device further comprises a hard disk drive.

27. The system defined in claim 20, wherein the routing data comprises first and second data, the first data identifying the plurality of remote sites, and the second data comprising a database containing a plurality of records, wherein each record of the database contains a first count representing the number of communications sent by a particular remote site to the system, and a second count representing the number of communications sent by the system to the particular remote site.

28. The system defined in claim 27, further comprising means for receiving input data from the sender of a communication.

29. The system defined in claim 28, wherein the means for comparing the routing data selects a specific remote site to receive a particular communication by comparing the input data with the first data to select a sub-group of remote sites from the plurality of remote sites, and by comparing the second data of each remote site of the selected sub-group.

30. The system defined in claim 20, further comprising means for prompting and interacting with the sender of a communication.

31. The system defined in claim 20, further comprising at least one terminal operatively associated with the central processing unit.

32. A method for routing a communication comprising the steps of:
storing routing data in a storage device operatively associated with a central processing unit, the routing data identifying a plurality of remote sites and associated with the frequency at which each of the remote sites has sent communications to the central processor;
receiving a communication at a central processor;
selecting a particular remote site to receive the communication based on an analysis of the routing data; and
forwarding the communication to the selected remote site.

33. The method of claim 32, further comprising the step of storing billing data for recording the identity of the originator of the communication and the selected remote site to which the communication was forwarded.

34. The method of claim 33, further comprising the step of transmitting the billing data via modem to a credit card processing company.

35. The method of claim 32, further comprising the step of receiving input data identifying the locale to which the communication is to be forwarded.

36. The method of claim 35, wherein the step of selecting a particular remote site comprises the steps of:
comparing the input data with the routing data to select a sub-group of remote sites from the plurality of remote site; and
analyzing the routing data for each remote site of the selected sub-group of remote sites to select a particular remote site.

37. The method of claim 32, further comprising the step of identifying the source of the communication.

38. The method of claim 37, further comprising the step of updating the routing data.

39. The method of claim 32, wherein the routing data is further associated with the frequency at which each of the remote sites has received communications from the central processor.

40. A method for routing orders which are received a central processor, comprising the steps of:
storing first data in a storage device identifying a plurality of remote sites and second data associated with the frequency at which each of the plurality of remote sites has sent orders to other remote sites;
receiving input data;
comparing the input data with the first data to select a sub-group of remote sites from the plurality of remote sites;
analyzing the second data for each remote site of the selected sub-group of remote sites to select a particular remote site; and
forwarding the order to the selected remote site.

41. A system for receiving an order at a central processor and for transmitting the order to one of a plurality of participating stores for completion of the order comprising:
a central processing unit;
means operatively associated with the central processing unit for receiving order data;
a storage device operatively associated with the central processing unit for storing routing data which identifies the plurality of participating stores and associated with the frequency at which each of the participating stores has referred orders to other participating stores;
means for analyzing the routing data and for selecting a particular store to receive the order data on the basis of the analysis; and
means responsive to said means for analyzing and selecting for transmitting the order data to the selected store.

42. A system for receiving orders for floral products at a central processor and for transmitting the order to one of a plurality of remote participating stores for completion of the order where the plurality of participating stores include computer terminals coupled together by a network system, comprising:
a central computer including a storage device for storing identification data which identifies the plurality of remote participating stores and order activity data associated with the quantity of orders that each of the remote participating stores has referred to other remote participating stores;
at least one terminal operatively associated with the central computer and operable to receive order data; and
means for operating the central computer to analyze the identification data to select a sub-group of remote participating stores and to select a particular remote participating store from the sub-group to which to relay particular order data by analyzing the order activity data for the sub-group of remote participating stores.

43. A system for routing orders to one of a plurality of remote shops comprising:
a computer including a central processing unit and a storage device to store first data identifying a plurality of remote shops and second data associated with the number of orders received by and referred by each of the remote shops;
a telephone switching system operatively associated with the computer for receiving and forwarding orders and for receiving location data identifying the location to which an order is intended to be sent;
means operatively associated with the central processing unit for comparing the input data with the first data to select a sub-group of remote shops from the plurality of remote shops;
means operatively associated with the central processing unit for analyzing the second data associated with each remote shop of the selected sub-group and selecting the shop which has the lowest ratio of number of orders received to number of orders sent; and
means operatively associated with the central processing unit for updating the second data after the order is forwarded.

44. A system for routing communications to one of a plurality of remote sites comprising:
a central processing unit;
a storage device operatively associated with the central processing unit to store first data identifying a plurality of remote sites and second data associated with the number of times that each of the remote sites has sent a communication to other remote sites for a prior period;
a selector operatively associated with the central processing unit to select a specific remote site to receive a particular communication from the system by analyzing the second data; and
a communication interface operatively associated with the central processing unit for forwarding the particular communication to the specific remote site.

45. A system for routing communications to one of a plurality of remote sites comprising:
a central processing unit;
a storage device operatively associated with the central processing unit to store data identifying a plurality of remote sites;
means for selecting a specific remote site to receive a particular communication based on the relative number of times that each of the remote sites has sent communications to other remote sites; and
a communication interface operatively associated with the central processing unit for forwarding the particular communication to the specific remote site.

46. A system for routing communications to one of a plurality of remote sites comprising:
- a central processing unit;
- a storage device operatively associated with the central processing unit to store first data identifying a plurality of remote sites and second data associated with the number of times that each of the remote sites has sent communications to other remote sites for a prior period;
- means for rewarding remote sites that frequently send communications to other remote sites by comparing the second data for at least two of the remote sites to select a specific remote site to receive a particular communication; and
- a communication interface operatively associated with the central processing unit for forwarding the particular communication to the specific remote site.

* * * * *

UNITED STATES PATENT AND TRADEMARK OFFICE
CERTIFICATE OF CORRECTION

PATENT NO. : 5,289,371

DATED : February 22, 1994

INVENTOR(S) : Abel et al.

It is certified that error appears in the above-indentified patent and that said Letters Patent is hereby corrected as shown below:

ON THE TITLE PAGE under the heading "Filed", delete "Apr." and substitute --Sep.--.

Column 2, under the heading "OTHER PUBLICATIONS", in the first line, delete "may" and substitute --May--.

Column 2, line 8, delete "Mar. 27" and substitute --August 27--.

Column 2, line 9, delete "Mar." and substitute --Feb.--.

Column 7, in Table 1, under "Description", next to Field 33, delete "is" and substitute --if--.

Column 8, line 11, delete "ID." and substitute --I.D.--.

Column 11, line 47, delete "a" and substitute --as--.

Column 15:

Claim 6, line 3, please delete ("PBX").

Claim 12, line 2, after "means" insert --,--.

Claim 12, line 2, after "associated" insert --with--.

UNITED STATES PATENT AND TRADEMARK OFFICE
CERTIFICATE OF CORRECTION

PATENT NO. : 5,289,371
DATED : February 22, 1994
INVENTOR(S) : Abel et al.

It is certified that error appears in the above-indentified patent and that said Letters Patent is hereby corrected as shown below:

Column 15:

Claim 13, line 2, after "associated" insert --with--.

Claim 40, line 1, after "received" insert --at--.

Signed and Sealed this

Ninth Day of April, 1996

Attest:

BRUCE LEHMAN

Attesting Officer

Commissioner of Patents and Trademarks